(12) United States Patent
Guo et al.

(10) Patent No.: US 11,319,844 B2
(45) Date of Patent: May 3, 2022

(54) FULLY VARIABLE VALVE TRAIN WITH ROTARY PLUNGER FOR INTERNAL COMBUSTION ENGINE

(71) Applicant: Harbin Engineering University, Harbin (CN)

(72) Inventors: Jie Guo, Harbin (CN); Zhuang Zhao, Harbin (CN); Wenping Zhang, Harbin (CN); Xinyu Zhang, Harbin (CN)

(73) Assignee: HARBIN ENGINEERING UNIVERSITY

( * ) Notice: Subject to any disclaimer, the term of this patent is extended or adjusted under 35 U.S.C. 154(b) by 15 days.

(21) Appl. No.: 17/129,447

(22) Filed: Dec. 21, 2020

(65) Prior Publication Data
US 2021/0199030 A1   Jul. 1, 2021

(30) Foreign Application Priority Data

Dec. 26, 2019   (CN) .......................... 201911366458.8

(51) Int. Cl.
*F01L 9/10*   (2021.01)
*F01L 9/40*   (2021.01)
*F01L 13/00*   (2006.01)

(52) U.S. Cl.
CPC .................. *F01L 9/10* (2021.01); *F01L 9/40* (2021.01); *F01L 13/0015* (2013.01); *F01L 2013/101* (2013.01); *F01L 2013/115* (2013.01); *F01L 2201/00* (2013.01); *F01L 2820/031* (2013.01); *F01L 2820/043* (2013.01)

(58) Field of Classification Search
CPC .......... F01L 9/10; F01L 9/40; F01L 13/0015; F01L 2013/101; F01L 2013/115; F01L 2201/00; F01L 2820/031; F01L 2820/043
USPC ................................ 123/90.12, 90.13, 90.15
See application file for complete search history.

(56) References Cited

U.S. PATENT DOCUMENTS

2004/0154565 A1\* 8/2004 Mischker .................. F01L 9/10
                                                                  123/193.5
2004/0211378 A1\* 10/2004 Diehl ........................ F01L 9/10
                                                                  123/90.13

\* cited by examiner

*Primary Examiner* — Jorge L Leon, Jr.
(74) *Attorney, Agent, or Firm* — Mark C. Johnson; Johnson Dalal

(57) ABSTRACT

A fully variable valve train with a rotary plunger for an internal combustion engine. A motor actuates a high-pressure oil injection pump; when a timing driven electromagnetic valve connected to an oil inlet is opened, high-pressure oil enters a hydraulic cylinder; and when the force applied to a plunger by the hydraulic oil is larger than the force of a valve returning spring, the plunger is pushed to move down, so that a valve is opened. When the valve is required to be return, the timing driven electromagnetic valve connected to the oil inlet is closed, and the timing driven electromagnetic valve connected to the oil inlet is opened; the valve moves up under the action of the valve spring, pushing the plunger to move up and thereby discharging the low-pressure oil out of the hydraulic cylinder, then the plunger and the valve return to the initial positions.

4 Claims, 2 Drawing Sheets

FULLY VARIABLE VALVE TRAIN WITH ROTARY PLUNGER FOR INTERNAL COMBUSTION ENGINE

TECHNICAL FIELD

The disclosure relates to a valve train, and more particularly, to a valve train for an internal combustion engine.

BACKGROUND

People are facing increasingly serious worldwide environmental problems and international energy crisis, which have gravely threatened the sustainable development of human society. Therefore, governments around the world have gradually started to attach importance to related techniques for improving engine fuel economy and reducing emissions of harmful substances and enacted increasingly tougher emission regulations. The intake and exhaust performance of an engine may exhibit significant effects on the dynamic performance, economy and emission performance of the engine. An engine may have varying requirements on optimal valve parameters in different-rotation speed operating conditions. In a traditional engine valve actuating mechanism, a mechanical cam is employed to control an intake valve and an exhaust valve. Due to an invariable cam profile, such valve parameters as valve lift and valve timing cannot be adjusted flexibly when the engine is running. In general, only the performance of the engine in a particular operating condition can be optimized. In 1980s, there emerged many patents and techniques of variable valve trains for engines based on improved cam actuating mechanisms. A large part of such techniques has been relatively mature, and the production and installation of them on automobiles have been achieved. However, all of such techniques permit changing of a cam profile or a cam phase angle to realize variable valves in essence; and these techniques can allow for optimization of the engine performance only in several operating conditions and cannot achieve real-time fully variable control to ensure optimal operation of the engine in each operating condition.

To break through the bottlenecks of the above cam variable techniques, researchers have designed a camless valve train, namely in a form of actuating a valve electromagnetically, electro-hydraulically, electrically or in other ways instead of using a cam and a follower thereof. Since a camless variable valve train is not restricted by the cam profile and such a system is provided with an electronic control unit, a signal fed back by a transducer can be processed and a corresponding control signal can be sent out according to an operating condition of an engine, so that valve parameters can be controlled flexibly and independently, allowing the engine to operate with the lowest harmful emissions, low fuel economy and optimal dynamic performance in different conditions. The valve actuating mechanism in such a form permits the simplification of the engine structure and the reduction of the manufacturing cost and the engine weight.

SUMMARY

An objective of the disclosure is to provide a fully variable valve train with a rotary plunger for an internal combustion engine that can solve the contradiction problem of dynamic performance and economy within a large rotation speed range.

The objective of the disclosure is achieved as follows:

A fully variable valve train with a rotary plunger for an internal combustion engine provided in the disclosure includes a fully variable valve train actuator, an oil reservoir and a high-pressure oil rail. An inlet of the high-pressure oil rail is communicated with the oil reservoir, while an outlet of the high-pressure oil rail is connected to a high-pressure oil inlet pipe adapter of the fully variable valve train actuator by means of an oil inlet pipe. A high-pressure oil return pipe adapter of the fully variable valve train actuator is connected to the oil reservoir by means of an oil return pipe. An oil-inlet timing driven electromagnetic valve is arranged on the oil inlet pipe, while an oil-return timing driven electromagnetic valve is arranged on the oil return pipe, and the oil-inlet timing driven electromagnetic valve and the oil-return timing driven electromagnetic valve are both connected to an Electronic Control Unit (ECU).

The fully variable valve train actuator includes a hydraulic cylinder, a plunger, a rack and an adjusting plunger. A plunger chamber and an adjusting plunger chamber are disposed in the hydraulic cylinder. The plunger is mounted in the plunger chamber. The adjusting plunger is mounted in the adjusting plunger chamber. The plunger includes a plunger head. A part, located below the adjusting plunger, of the adjusting plunger chamber is communicated with a part, located below the adjusting plunger, of the adjusting plunger chamber. A first adjusting plug adjustable in position is mounted at an upper end of the adjusting plunger chamber. An adjusting spring is mounted between the first adjusting plug and the adjusting plunger. A lower end of the plunger has gear, and the rack is engaged with the gear of the plunger, thus driving the plunger to rotate.

The disclosure may further include the following aspects.

1. A pressure transducer is arranged on the high-pressure oil rail and further connected to the ECU. An overflow port of the high-pressure oil rail is connected to an oil reservoir by means of an overflow pipe. A high-pressure relief valve is arranged at the overflow port. A filter, a high-pressure oil injection pump and an energy accumulator are arranged between the oil reservoir and the high-pressure oil rail.

2. A second adjusting plug adjustable in position is mounted at an upper end of the plunger chamber.

The disclosure has the following advantages: the contact length of the plunger with the oil return hole can be controlled by rotating the plunger; by this method, the lift can be controlled flexibly, and flexible fully variable adjustment of engine valve parameters can be achieved; moreover, a hydraulic dead zone may be formed at seating, leading to a low valve speed; thus, the valve impact is greatly reduced as compared with other variable valve trains, and the vibration and noise of the engine due to the crash impact are reduced.

DETAILED DESCRIPTION

The disclosure will be described by way of example in more detail below with reference to the accompanying drawings.

Figure 1:
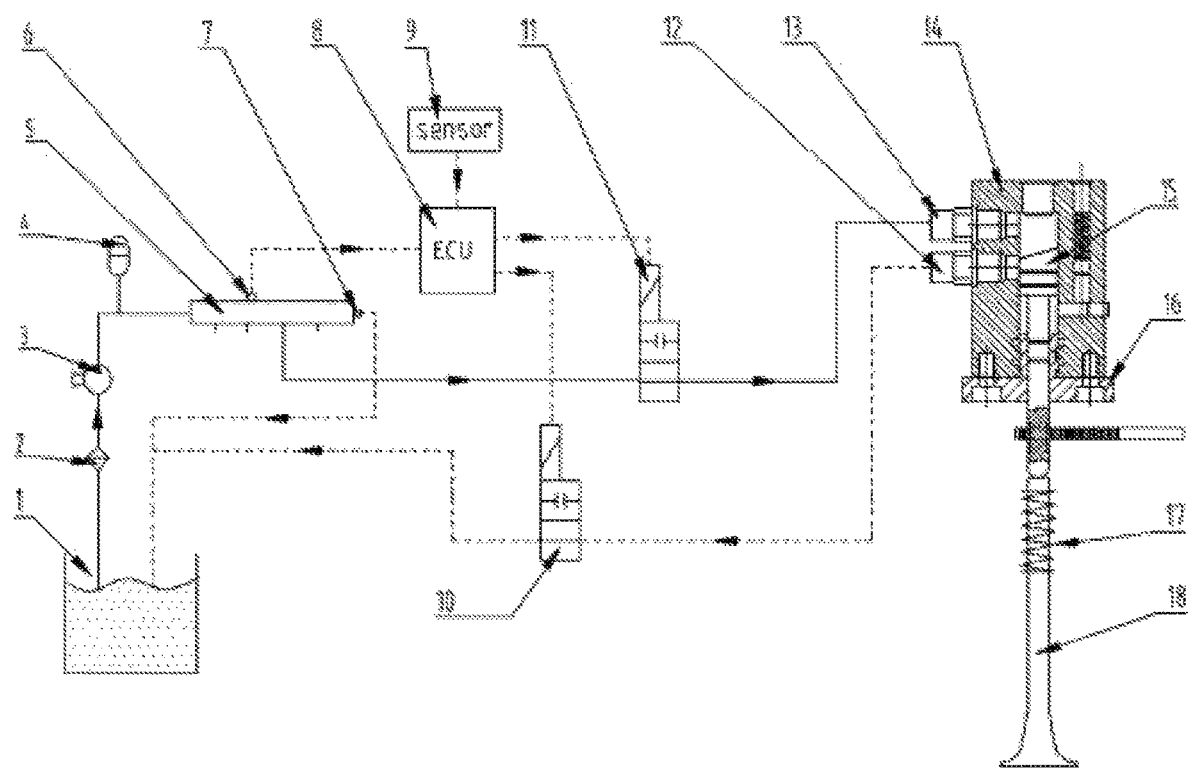
FIG. 1 is a schematic diagram illustrating a structure according to an example of the disclosure.
Figure 2:
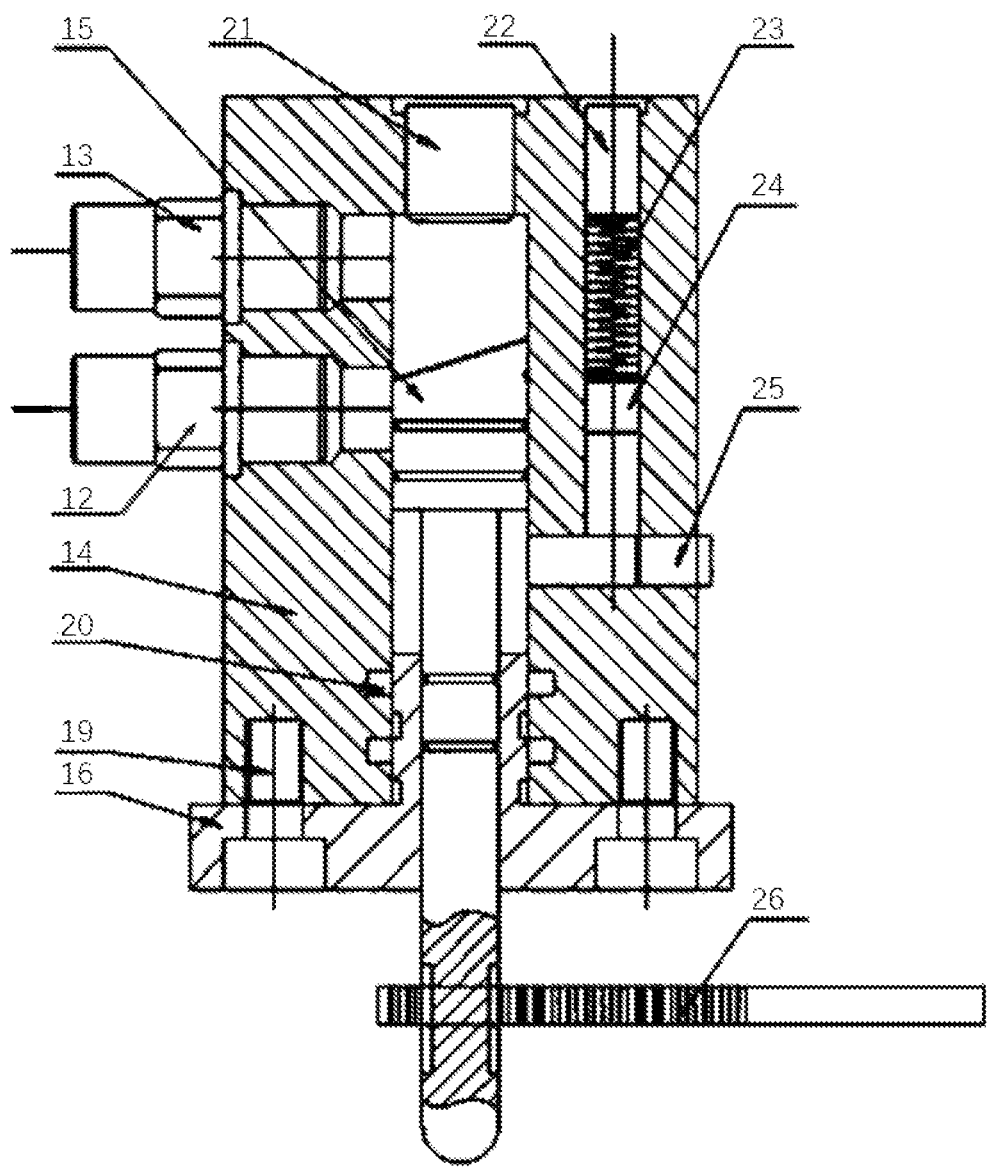
FIG. 2 is a schematic diagram illustrating a structure of a fully variable valve train actuator according to an example of the disclosure.

Referring to FIG. 1 and FIG. 2, a fully variable valve train according to an example of the disclosure includes an oil reservoir 1, a filter 2, a high-pressure oil injection pump 3, an energy accumulator 4, a high-pressure oil rail 5, a pressure transducer 6, a high-pressure relief valve 7, an electronic control unit 8, a rotation speed transducer 9, timing driven electromagnetic valves 10 and 11, a high-pressure oil return pipe adapter 12, a high-pressure oil inlet pipe adapter 13, a hydraulic cylinder 14, a plunger 15, a mounting base 16, a valve returning spring 17, and a valve 18. As shown in FIG. 2, a variable valve train actuator includes a mounting base 16, a fixing bolt 19, an O-shaped sealing ring 20, a hydraulic cylinder 14, a high-pressure oil return pipe adapter 12, a high-pressure oil inlet pipe adapter 13, a plunger 15, a second adjusting plug 21, a first adjusting plug 22, an adjusting spring 23, an adjusting plunger 24, a plug 25, and a rack 26.

As shown in FIG. 1, when the valve train is not started, the plunger 15 is located at the top under the action of the valve returning spring 17. In this case, the timing driven electromagnetic valves 10 and 11 do not operate and wait for a pulse signal from the electronic control unit 8, and meanwhile, low-pressure oil is present in the plunger chamber. When the system starts running, the high-pressure oil injection pump 3 is driven by a motor to draw hydraulic oil from the oil reservoir 1, and impurities in the hydraulic oil are filtered out by the filter 2 therebetween, guaranteeing clean hydraulic oil entering the oil circuit. The energy accumulator 4 guarantees stable pressure of the hydraulic oil circuit and reduces fluctuation. Subsequently, high-pressure hydraulic oil flows into the high-pressure oil rail 5 on which the pressure transducer 6 for transmitting a pressure signal to the electronic control unit 8 in real time and the high-pressure relief valve 7 are mounted. When the oil pressure is excessively high, the relief valve 7 is opened to return the redundant hydraulic oil to the oil reservoir 1. The electronic control unit 8 controls opening and closing of two timing driven electromagnetic valves 10 and 11. When the timing driven electromagnetic valve 11 is opened, high-pressure oil enters the hydraulic cylinder 14, leading to increase of the pressure within the chamber. When the force applied to the plunger 15 by the hydraulic oil is larger than the force of the valve returning spring 17, the plunger 15 is pushed to move down, so that the valve 18 is opened. When the valve is required to return, the electromagnetic valve 11 connected to a high-pressure oil source is closed, while the timing driven electromagnetic valve 10 connected to a low-pressure oil source is opened. The valve 18 moves up under the action of the valve spring 17, pushing the plunger 15 to move up and thereby discharging the low-pressure oil out of the hydraulic cylinder, and then the plunger 15 and the valve 18 return to initial positions. Thus, one cycle is completed. In this process, the electronic control unit 8 receives a rotation speed signal from a crankshaft end and matches different orders of opening and closing timing electromagnetic valves with different rotation speeds to realize variable timing of the valve train.

The structure diagram of the variable valve train actuator is designed according to the operating principle of the variable valve train, as shown in FIG. 2. With the hydraulic cylinder 14 as the major structure, the high-pressure hydraulic oil and the low-pressure hydraulic oil flow back and forth to push the plunger 15 to move, thus achieving the purpose of replacing the traditional cam plunger structure. Compared with a simple hydraulic cylinder, the actuator has a hydraulic buffer additionally, which is composed of four parts 22, 23, 24 and 25 as shown in the figure. When the plunger 15 moves down, the spring is compressed continuously, and with increasing compressive force, the plunger 15 moves down increasingly slower. As a result, the hydraulic oil below the plunger is squeezed out and moves into a pipe on the right. Nonetheless, with a dead zone below the plunger, a part of hydraulic oil cannot flow out and thus serves as a cushion. When the plunger moves to the dead zone of the hydraulic oil below, the plunger 15 is above and thus buffered by the oil cushion, so that the valve speed and impact can be significantly reduced. Moreover, a structure for rotating the plunger by means of an adjusting rack. When the lift needs to be adjusted, the rack 26 drives the plunger 15 to rotate so as to change the length of a part, in contact with an oil return hole, of the plunger 15, because the course of opening the intake valve depends on the length of the part, in contact with the oil return hole, of the plunger. The longer the contact part of the plunger, the longer the plunger stroke and the greater the valve lift. Rotation speed signals received by a transducer are matched with different lifts, thereby realizing instant lift adjustment.

The rack 26 drives the plunger to rotate in the actuator, and the contact length of the plunger with the oil return hole is controlled by rotating the plunger. Different contact lengths may result in different movement lengths of the plunger, and the greater the contact length, the longer the movement distance of the plunger. Thus, the lift can be controlled by this method.

The structure composed of the hydraulic cylinder 14, the first adjusting plug 22, the adjusting spring 23, the adjusting plunger 24, and the plug 25 allows a hydraulic dead zone to be formed in the valve at seating, leading to a low valve speed. Thus, the valve impact is greatly reduced as compared with other variable valve trains, and the vibration and noise of the engine due to the crash impact are reduced.

The operating process of the fully variable valve train is as follows: the actuator is connected to the timing driven electromagnetic valves through oil pipes; when the system starts running, the motor actuates the high-pressure oil injection pump; when the timing driven electromagnetic valve connected to the oil inlet is opened, high-pressure oil enters the hydraulic cylinder, leading to increase of the pressure within the chamber; and when the force applied to the plunger by the hydraulic oil is larger than the force of the valve returning spring, the plunger is pushed to move down, so that the valve is opened. When the valve is required to be return, the timing driven electromagnetic valve connected to the oil inlet is closed, and the timing driven electromagnetic valve connected to the oil outlet is opened; the valve moves up under the action of the valve spring, pushing the plunger to move up and thereby discharging the low-pressure oil out of the hydraulic cylinder, and then the plunger and the valve returning spring to the initial positions. Thus, one cycle is completed. When the lift needs to be adjusted, the rack drives the plunger to rotate so as to change the length of the part, in contact with the oil return hole, of the plunger, that is, the course of opening the intake valve depends on the length of the part, in contact with the oil return hole, of the plunger. The longer the contact part of the plunger, the longer the plunger stroke and the greater the valve lift. The upper surface of the plunger is an inclined surface, and a sealing ring is arranged on the plunger to prevent oil leakage.

What is claimed is:

1. A fully variable valve train for an internal combustion engine, the fully variable valve train comprising:
an oil reservoir;
a high-pressure oil rail in fluid communication with the oil reservoir via a supply pipe; and
a hydraulic cylinder including:
a high-pressure oil inlet pipe adapter in fluid communication with the high-pressure oil rail via an oil inlet pipe;
a high-pressure oil return pipe adapter in fluid communication with the oil reservoir via an oil return pipe;
a rotary plunger disposed in a rotary plunger chamber; and
an adjusting plunger disposed in an adjusting plunger chamber;
an oil-inlet timing driven electromagnetic valve arranged in the oil inlet pipe;
an oil-return timing driven electromagnetic valve arranged in the oil return pipe; and
an electronic control unit (ECU) connected to the oil-inlet timing driven electromagnetic valve and the oil-return timing driven electromagnetic valve,
wherein the adjusting plunger chamber comprises an upper end including a first adjustable plug, and an adjusting spring mounted between the first adjustable plug and the adjusting plunger, and
wherein the rotary plunger comprises an upper end including a plunger head, and a lower end including a gear engaged with a rack configured to rotate the rotary plunger.

2. The fully variable valve train according to claim 1, wherein the ECU is further connected to a pressure transducer arranged on the high-pressure oil rail,
wherein an overflow port of the high-pressure oil rail is in fluid communication with the oil reservoir via an overflow pipe,
wherein a high-pressure relief valve is arranged at the overflow port, and
wherein a filter, a high-pressure oil injection pump, and an energy accumulator are arranged in the supply pipe.

3. The fully variable valve train according to claim 2, wherein a second adjustable plug is mounted at an upper end of the rotary plunger chamber.

4. The fully variable valve train according to claim 1, wherein a second adjustable plug is mounted at an upper end of the rotary plunger chamber.

* * * * *